United States Patent
Huang et al.

(10) Patent No.: US 11,940,678 B2
(45) Date of Patent: Mar. 26, 2024

(54) STRESSED SILICON MODULATOR

(71) Applicant: Intel Corporation, Santa Clara, CA (US)

(72) Inventors: Mengyuan Huang, Cupertino, CA (US); David Patel, San Jose, CA (US); Kejia Li, San Jose, CA (US); Wei Qian, Walnut, CA (US); Ansheng Liu, Cupertino, CA (US)

(73) Assignee: Intel Corporation, Santa, Clara, CA (US)

( * ) Notice: Subject to any disclaimer, the term of this patent is extended or adjusted under 35 U.S.C. 154(b) by 456 days.

(21) Appl. No.: 17/131,470

(22) Filed: Dec. 22, 2020

(65) Prior Publication Data

US 2022/0019098 A1 Jan. 20, 2022

Related U.S. Application Data

(60) Provisional application No. 63/051,791, filed on Jul. 14, 2020.

(51) Int. Cl.
 *G02F 1/025* (2006.01)
(52) U.S. Cl.
 CPC ........ *G02F 1/025* (2013.01); *G02F 2201/063* (2013.01); *G02F 2202/105* (2013.01)

(58) Field of Classification Search
 None
 See application file for complete search history.

(56) References Cited

U.S. PATENT DOCUMENTS

| | | | | |
|---|---|---|---|---|
| 6,298,177 | B1 * | 10/2001 | House | G02F 1/025 385/3 |
| 10,274,757 | B2 * | 4/2019 | Fujikata | G02F 1/025 |
| 11,054,675 | B2 * | 7/2021 | Fujikata | G02F 1/015 |
| 11,728,624 | B2 * | 8/2023 | Clifton | H01S 5/187 372/45.011 |
| 2018/0284559 | A1 * | 10/2018 | Fujikata | G02F 1/2257 |
| 2020/0150344 | A1 * | 5/2020 | Jayatilleka | G02B 6/12007 |
| 2022/0019098 | A1 * | 1/2022 | Huang | G02F 1/025 |

OTHER PUBLICATIONS

Yu, Decai et al., "First-principles study of electronic properties of biaxially strained silicon: Effects on charge carrier mobility", Physical Review B vol. 78, 2008, 8 pgs.

* cited by examiner

*Primary Examiner* — Rhonda S Peace
(74) *Attorney, Agent, or Firm* — Essential Patents Group, LLP

(57) ABSTRACT

An optical modulator includes a substrate, a first dielectric layer over the substrate, a rib waveguide including a PN junction on the first dielectric, a second dielectric layer over the rib waveguide and a stressor layer including a metal, where the first or the second dielectric is between the stressor layer and the PN junction.

20 Claims, 10 Drawing Sheets

US 11,940,678 B2

STRESSED SILICON MODULATOR

CLAIM OF PRIORITY

This application claims priority to Provisional Patent Application No. 63/051,791, filed on Jul. 14, 2020 and titled "STRESSED SILICON MODULATOR," which is incorporated herein by reference in its entirety.

TECHNICAL FIELD

Embodiments of the present disclosure relate to semiconductor devices, and more particularly to silicon modulators with a stress inducing film.

BACKGROUND

Optical modulators are commonly based on silicon photonics. In order to improve the phase efficiency of optical modulators, the doping concentrations of the P-type and N-type regions of the PN junction may be increased. However, increasing the dopant concentration decreases the width of the depletion region. This in turn results in an increase in the capacitance of the PN junction, and reduces bandwidth performance.

It has been proposed to improve phase efficiency by straining the PN junction using a SiGe layer. However, in order to have a large strain, Ge in the SiGe layer needs to be greater than 20 atomic percent. This causes the SiGe direct band to be close to 1310 nm, and significantly increases the absorption of optical signals at 1310 nm wavelength. Additionally, in order to have larger stress, the thickness of the SiGe layer needs to be significantly large (e.g., beyond the metastable thickness of approximately 50 nm for 20 atomic percent SiGe). This causes a relaxed SiGe microstructure and generates misfit and threading dislocations inside the SiGe. As such, there is a high leakage current and loss of optical signal.

EMBODIMENTS OF THE PRESENT DISCLOSURE

Figure 1:
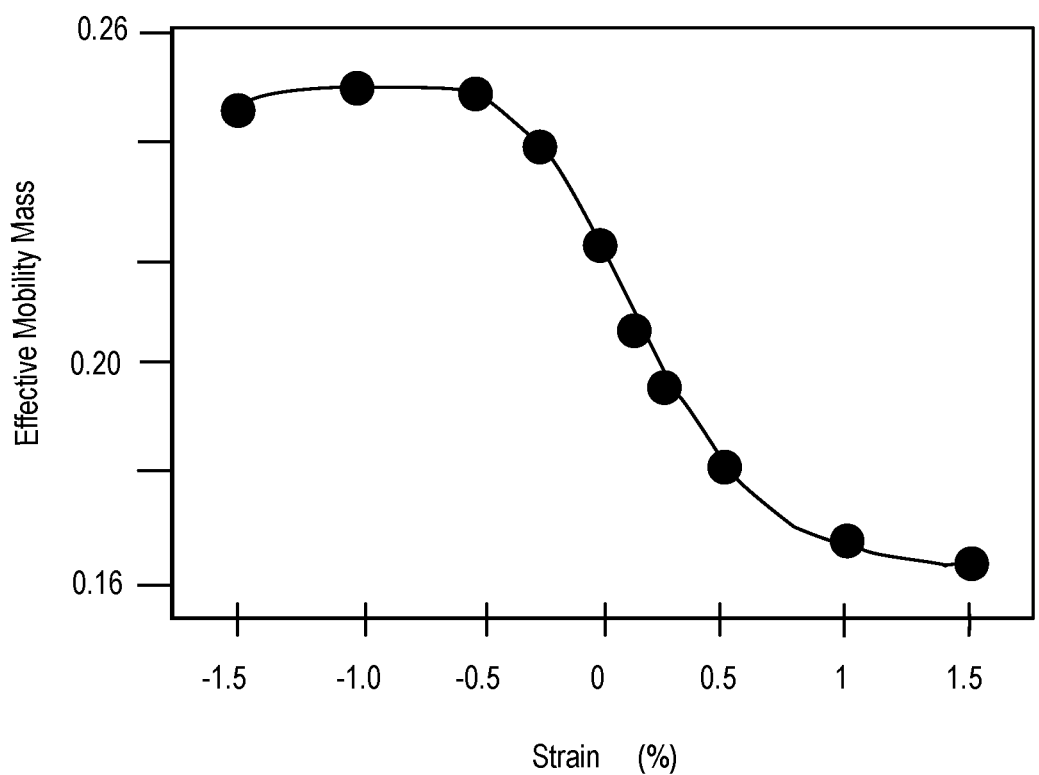
FIG. 1 is a graph of the effective mass of holes in silicon when the silicon is under strain, in accordance with an embodiment.

Described herein are silicon modulators with a stress inducing film, in accordance with various embodiments. In the following description, various aspects of the illustrative implementations will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative implementations. However, it will be apparent to one skilled in the art that the present invention may be practiced without the specific details. In other instances, well-known features are omitted or simplified in order not to obscure the illustrative implementations.

In some instances, in the following description, well-known methods and devices are shown in block diagram form, rather than in detail, to avoid obscuring the present disclosure. Reference throughout this specification to "an embodiment" or "one embodiment" or "some embodiments" means that a particular feature, structure, function, or characteristic described in connection with the embodiment is included in at least one embodiment of the disclosure. Thus, the appearances of the phrase "in an embodiment" or "in one embodiment" or "some embodiments" in various places throughout this specification are not necessarily referring to the same embodiment of the disclosure. Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, electrical or in magnetic contact with each other, and/or that the two or more elements co-operate or interact with each other (e.g., as in a cause an effect relationship).

The terms "over," "under," "between," and "on" as used herein refer to a relative position of one component or material with respect to other components or materials where such physical relationships are noteworthy. For example, in the context of materials, one material or material disposed over or under another may be directly in contact or may have one or more intervening materials. Moreover, one material disposed between two materials may be directly in contact with the two layers or may have one or more intervening layers. In contrast, a first material "on" a second material is in direct contact with that second material/material. Similar distinctions are to be made in the context of component assemblies. As used throughout this description, and in the claims, a list of items joined by the term "at least one of" or "one or more of" can mean any combination of the listed terms.

The term "adjacent" here generally refers to a position of a thing being next to (e.g., immediately next to or close to with one or more things between them) or adjoining another thing (e.g., abutting it).

The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

As used throughout this description, and in the claims, a list of items joined by the term "at least one of" or "one or more of" can mean any combination of the listed terms.

Unless otherwise specified in the explicit context of their use, the terms "substantially equal," "about equal" and "approximately equal" mean that there is no more than incidental variation between two things so described. In the art, such variation is typically no more than +/−10% of a predetermined target value.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

Various operations will be described as multiple discrete operations, in turn, in a manner that is most helpful in understanding the present invention, however, the order of description should not be construed to imply that these operations are necessarily order dependent. In particular, these operations need not be performed in the order of presentation.

As noted above, attempts to improve the efficiency of optical modulators is not without issue. Increasing the dopant concentrations of the PN junction leads to an increase in the capacitance (which decreases bandwidth performance), and inducing stress by providing a SiGe layer on the PN junction can lead to increases in leakage current. Accordingly, embodiments disclosed herein provide a stress inducing layer that is disposed above and/or below the PN junction. Particularly, the stress inducing layer may include tungsten, titanium, aluminum, or other CMOS backend materials that are capable of providing tensile strain inside the PN junction.

In order to provide context for embodiments disclosed herein, several equations that define the performance of the optical modulator are provided. The change of refractive index is provided in Equation 1 and the loss (from free carrier absorption) is given in Equation 2.

$$\Delta n = -\frac{e^2 \lambda^2}{8\pi^2 c^2 \varepsilon_0 n}\left(\frac{\Delta N_e}{m^*_{ce}} + \frac{\Delta N_h}{m^*_{ch}}\right) \quad \text{Equation 1}$$

$$\Delta k = -\frac{e^3 \lambda^3}{16\pi^3 c^3 \varepsilon_0 n}\left(\frac{\Delta N_e}{\mu_e (m^*_{ce})^2} + \frac{\Delta N_h}{\mu_h (m^*_{ch})^2}\right) \quad \text{Equation 2}$$

In Equation 1 and Equation 2, $\Delta n$ is the change of refractive index, $\Delta k$ is the change of free carrier absorption extinction coefficient, and $\Delta N_h$ and $\Delta N_e$ are the changes of hole density and electron density, respectively. The variables $m^*_{ce}$ and $m^*_{ch}$ are effective mass of electrons and holes, respectively. The variables $\mu_e$ and $\mu_h$ are the mobility of electrons and holes, respectively. The remaining terms are constants (e.g., electron charge, operating wavelength, light speed, vacuum permittivity, etc.).

When the optical modulator is operated with a driver with a fixed swing ($\Delta V$), the driver voltage change, doping concentration, and depletion change have the relationship shown in Equation 3, where N is the doping concentration in the depletion region and $\Delta d$ is the change of the depleted width. For small modulator rib regions (i.e., the PN junction), with a typical width of approximately 400 nm, the P and N doping concentrations are uniform which provides the relationships shown in Equation 4 and Equation 5.

$$\Delta V \propto N(\Delta d)^2 \quad \text{Equation 3}$$

$$\Delta N_e = N_e \Delta d_e \quad \text{Equation 4}$$

$$\Delta N_h = N_h \Delta d_h \quad \text{Equation 5}$$

Typically, modulator phase efficiency is improved by increasing the doping concentration. However, increases to the doping concentration also result in a decrease in the depletion width of the PN junction ($d_{pn}$). As shown in Equation 6, reductions in the depletion width $d_{pn}$ result in an increase in the capacitance of the PN junction ($C_{pn}$).

$$C_{pn} = \frac{\varepsilon_0 \varepsilon_{si} A}{d_{pn}} \quad \text{Equation 6}$$

As shown in Equation 7, an increase in the capacitance of the PN junction negatively effects the modulators bandwidth performance. In Equation 7, $R_{pn}$ is the PN junction serial resistance, $C_{pn}$ is the PN junction capacitance, $Z_{MOD}$ is the impedance of the modulator PN junction shifter, and $L_{MOD}$ is the length of the modulator PN junction shifter.

$$f_{E0,3\,dB}^2 \approx \frac{1}{R_{pn} C_{pn}^2} \cdot \frac{0.74}{2\pi^2 Z_{MOD} L_{MOD}} \quad \text{Equation 7}$$

Accordingly, embodiments disclosed herein include architectures that provide improved modulator efficiency without increasing the capacitance. This is done by decreasing the effective mass of the holes. As shown in Equation 1, decreases in the effective mass of the holes will result in increases in the refractive index. Changes in the refractive index in a waveguide, such as a rib waveguide discussed herein, causes a phase shift in light that is propagating through rib waveguide. The effective mass of the holes is decreased by stressing the silicon. For normal unstressed silicon, both heavy holes and light holes are the outermost valence bands. However, the valence bands split, and the light holes band becomes the outermost band when the silicon is under tensile stress. Since the effective mass of the light holes is much less than the effective mass of the heavy holes, the introduction of tensile strain to the modulator can significantly reduce the effective mass of the holes in the modulator. This trend is shown in FIG. 1. As shown, the effective mass is changed from approximately 0.22 me to approximately 0.18 me with a 0.5% tensile strain. This reduction in effective mass results in an approximately 18% improvement in the change of the refractive index without needing to change the carrier density. As shown, the effective mobility mass is substantially constant when strain is between −1.5% and 0.5% and drops approximately linearly when strain decreases to 0%. An increase in positive strain from 0% to 1.5% further causes a drop in effective mobility mass.

In an embodiment, tensile strain is induced in the PN junction by the use of a stress inducing layer. The stress inducing layer may include tungsten, titanium, aluminum, or other CMOS backend materials that are capable of providing tensile strain inside the PN junction. The stress inducing layer may be above and/or below the PN junction.

Figure 2A:
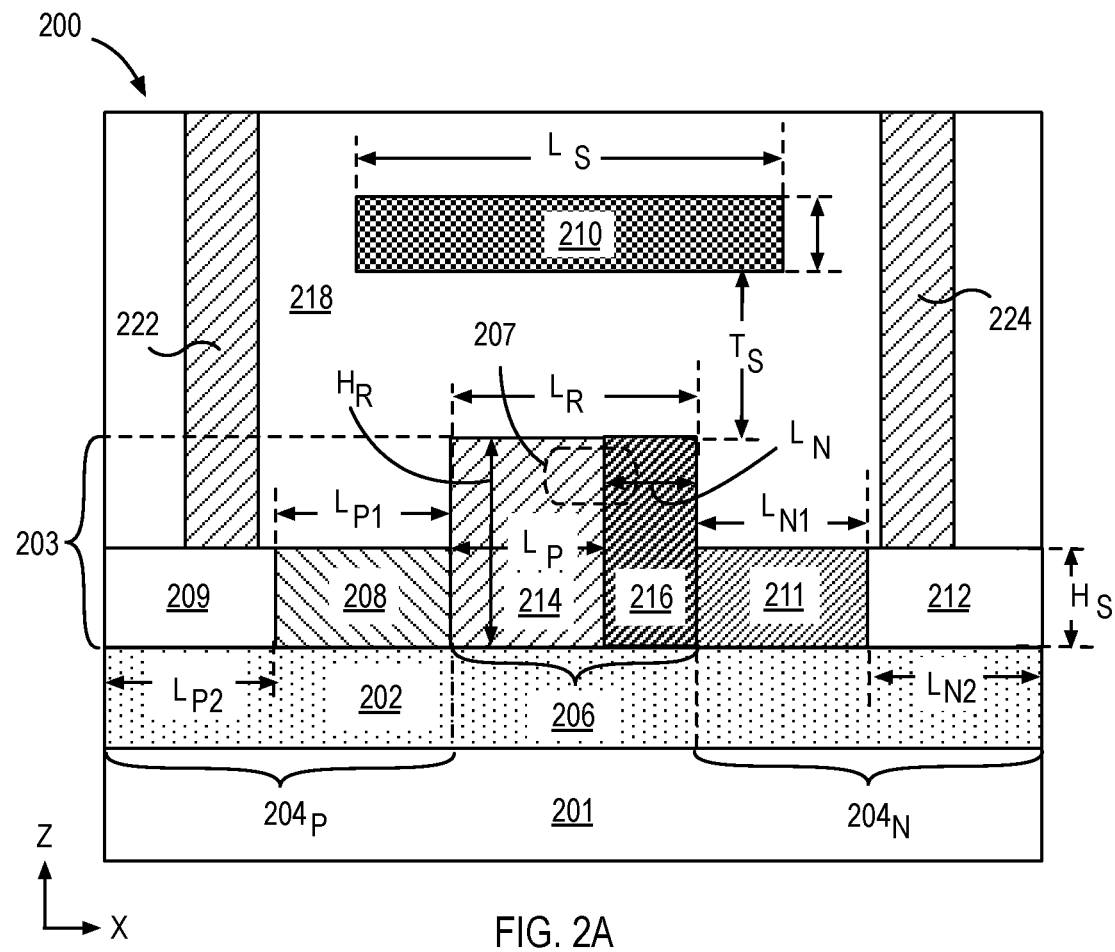
FIG. 2A is a cross-sectional illustration of an optical modulator with a stressor layer over the PN junction, in accordance with an embodiment.

Referring now to FIG. 2A, a cross-sectional illustration of an optical modulator 200 is shown, in accordance with an embodiment of the present disclosure. In an embodiment, the optical modulator 200 may comprise a substrate 201. The substrate 201 may be a semiconductor substrate. In a particular embodiment, the substrate 201 includes monocrystalline silicon. In an embodiment, layer 202 is provided above the substrate 201. In some embodiments, the layer 202 includes a silicon and oxygen, for e.g., silicon oxide, silicon and nitrogen, e.g., silicon nitride. In an embodiment, exemplary embodiment, the layer 202 includes silicon oxide. The layer 202 may be referred to as a buried oxide layer (BOX) where the layer 202 is below a device layer 203 including monocrystalline silicon. In some embodiments, the structure may be referred to as a silicon on insulator (SOI) structure since the silicon device layer 203 is over an underlying layer 202 including silicon oxide.

Figure 2B:
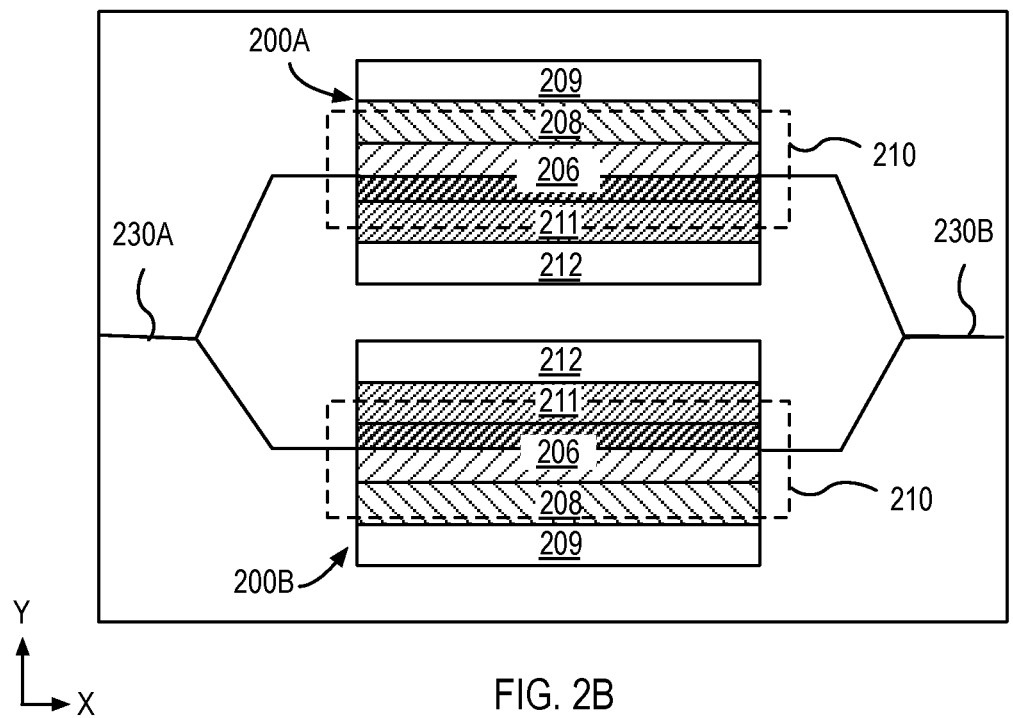
FIG. 2B is a plan-view illustration of the structure in FIG. 1 including an addition optical modulator.

In an embodiment, the device layer 202 includes a rib waveguide 206. An optical mode (inside dashed box is conveyed by rib waveguide 206. A passive silicon waveguide may be coupled with an end of rib waveguide 206, as shown in FIG. 2B. Referring again to FIG. 2A, in an embodiment, the rib waveguide 206 includes a PN junction (herein rib region 206) having a P-doped region 214 adjacent to an N-doped region 216. P-doped region 214 has a first impurity dopant concentration and the N-doped region 216 has a second impurity dopant concentration. The first and the second impurity dopant concentrations may or may not be equal. In the illustrated embodiment, the P doped region 214 has a lateral thickness, $L_P$, (in the x-direction) that is larger than a lateral thickness, LN, of the N doped region 216. In other embodiments, the P doped region 214 and the N doped region 216 may have a same lateral thickness, or the lateral thickness, LN may be larger than $L_P$. In an embodiment, a total lateral thickness of the rib region 206 may be between approximately 300 nm and approximately 500 nm. As shown rib region 206 has a vertical thickness, $H_R$ (in the Z-direction). In an embodiment, the thickness, $H_R$, of the rib region 206 is between approximately 200 nm and approximately 400 nm.

In an embodiment, the optical modulator 200 further includes a pair of slab regions adjacent to the rib region 206. For example, a pair of slab regions $204_P$ and $204_N$ are adjacent to the rib region 206. The slab region $204_P$ may include a P+ doped region 208 immediately adjacent to the P-doped region 214 and a P++ doped region 209 (herein slab region 209) adjacent to the P+ doped region. The slab region $204_N$ may include an N+ doped region 211 (herein slab region 211) immediately adjacent to the N-doped region 216 and an N++ doped region 212 (herein slab region 212) adjacent to the slab region 211.

In an embodiment, slab regions $204_P$ and $204_N$ have a vertical thickness, $H_S$. The vertical thickness of the slab regions $204_P$ and $204_N$ are less than a vertical thickness, $H_R$, of the rib region 206. It is advantageous for $H_R$ to be greater than $H_S$ to enable confinement of the optical mode within the rib region 206. In embodiments, $H_S$ is between approximately 80 nm and approximately 180 nm.

In an embodiment, a vertical thickness, $H_R$ (in the Z-direction) of the rib region 206 may be greater than a thickness of the slab regions $204_P$ and $204_N$. In an embodiment, the thickness, $H_R$, of the rib region 206 is between approximately 200 nm and approximately 400 nm, and the thickness, $H_S$, of slab region 204 is between approximately 80 nm and approximately 180 nm.

As shown, the slab regions 211 and 212 have a lateral thickness, $L_{N1}$ and $L_{N2}$, respectively. In embodiments, the slab regions 211 and 212 have a lateral thickness, $L_{N1}$ and $L_{N2}$, respectively, and the slab regions 208 and 209 have a lateral thickness, $L_{P1}$ and $L_{P2}$, respectively. In embodiments, $L_{N1}$, $L_{N2}$, $L_{P1}$ and $L_{P2}$ are each at least 10 nm but less than 1 micron.

In an embodiment, a dielectric 218 is above top surfaces of the rib region 206 and the slab regions $204_P$ and $204_N$. The dielectric 218 may be the same material as the BOX layer 202. In other embodiments, the dielectric 218 may be a different material than the BOX layer 202. In an embodiment, the dielectric 218 may include a silicon oxide (e.g., $SiO_2$), silicon nitride (SiN) or silicon oxynitride (SiNxOy).

In an embodiment, a stressor layer 210 (herein stress inducing film 210) is embedded in the dielectric 218. The stress inducing film 210 may be positioned above the rib region 206. In the illustrated embodiment, a lateral thickness, $L_S$, of the stress inducing film 210 is greater than a lateral thickness, $L_R$, of the rib region 206. As such, portions of the stress inducing film 210 may extend over portions of the slab regions $204_P$ and $204_N$ in some embodiments. In an embodiment, the stress inducing film 210 may be vertically spaced away from the rib region 206 by a distance $T_S$. For example, $T_S$, may be approximately 0.5 μm or greater. In a particular embodiment, the stress inducing film 210 may be spaced away from the rib region 206 by a distance, $T_S$, that is approximately 1.0 μm.

In an embodiment, the stress inducing film 210 includes a material that induces a tensile stress in the underlying rib region 206. For example, the tensile strain induced in the rib region 206 by the stress inducing film 210 may be between 0% and 1%. In an exemplary embodiment, the stress induced in the rib region 206 by the stress inducing film 210 may be approximately 0.5%.

In an embodiment, the stress is induced into the rib region 206 due to a difference in coefficient of thermal expansion (CTE) between the stress inducing film 210 and the substrate 201. In exemplary embodiment, substrate 201 includes silicon. The stress inducing film 210 may be deposited (processed) at high temperature (e.g., greater than 300° C.). When the temperature drops to room temperature, because of existence of CTE differences, the stress inducing film 210 expands more than a silicon-substrate 201, and results in tensile strain being induced into the silicon rib 206. In an embodiment, the stress inducing film 210 may include a conductive material. For example, the stress inducing film 210 may include tungsten, titanium, aluminum, or other CMOS backend materials with a CTE that is greater than that of silicon-substrate 201.

The optical modulator 200 further includes a pair of contact metallization structures coupled with the slab regions $204_N$ and $204_P$. In the illustrative embodiment, a contact metallization 222 is coupled with the P++ region 209, and a contact metallization 224 is coupled with the N++ region 212. The contact metallization 222 and 224 enables voltage biasing of the PN junction to tune a depletion width in the PN junction. As shown, the contact metallization 222 and 224 are laterally spaced apart from the rib region 206 to prevent optical insertion loss due to light attenuation by one or more metals in the contact metallization structures 222 and 224.

FIG. 2B is a plan view of a pair of optical modulators 200A and 200B. In an exemplary embodiment, optical modulators 200A and 200B are each substantially identical to optical modulator 200. Passive silicon waveguides 230A and 230B may be coupled to a rib region 206 of each optical modulator 200A and 200B, as shown. An outline of the stressor layer 210, of each optical modulator 200A and 200B, is indicated by dashed lines to provide clarity.

Figure 3:
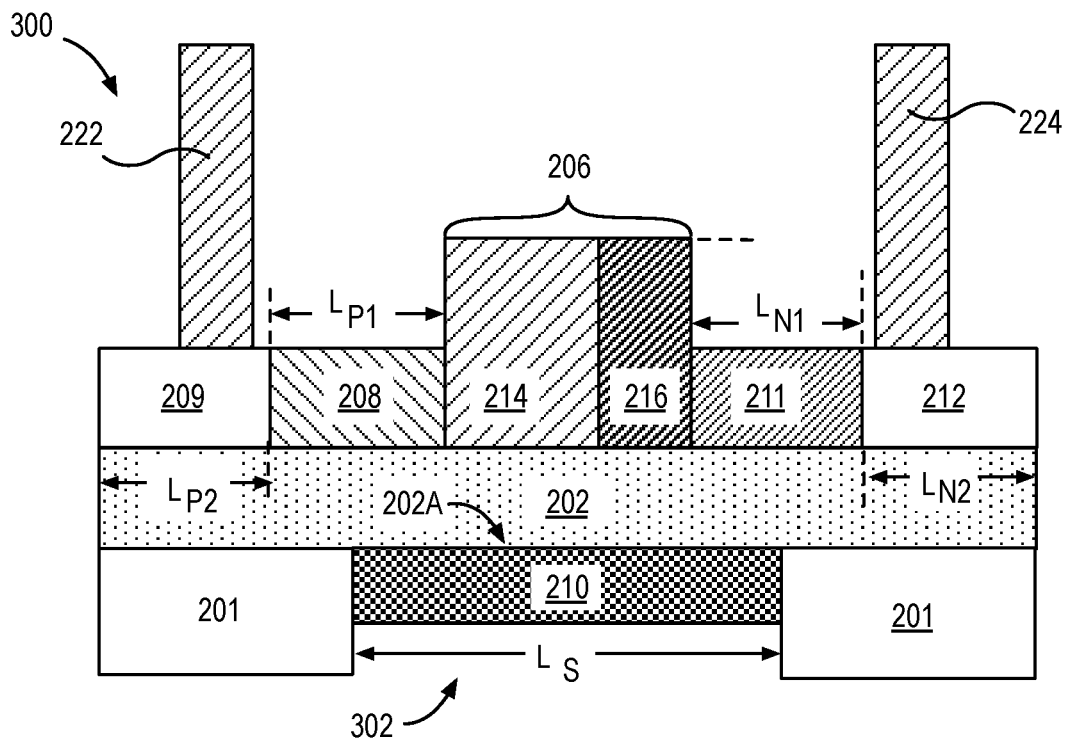
FIG. 3 is a cross-sectional illustration of an optical modulator with a stressor layer below the PN junction, in accordance with an embodiment.

Referring now to FIG. 3, a cross-sectional illustration of an optical modulator 300 is shown, in accordance with an additional embodiment. The optical modulator 200 in FIG. 3 may include one or more features of the optical modulator 200 in FIG. 2A. In the illustrative embodiment, a stress inducing film 310 is provided below the rib region 206 instead of above the rib region 206. The stress inducing film 310 includes one or more features of the stress inducing film 210. Stress inducing film 310 has a lateral thickness, $L_S$ as shown.

In an embodiment, an opening 302 is formed through the substrate 201, and the stress inducing film 210 is provided on the backside surface 202A of the BOX 202. In some embodiments, the lateral thickness, $L_S$, of the stress inducing film 210 is equal to or greater than a lateral thickness, $L_R$, of the rib region 206. As such, the stress inducing film 210 may extend below portions of the slab regions $204_N$ and $204_P$. In an embodiment, the remainder of the opening 302 may remain unfilled (as shown in FIG. 3). In other embodiments, after the stress inducing film 310 is formed, a dielectric material may fill the remainder of the opening 302.

Figure 4:
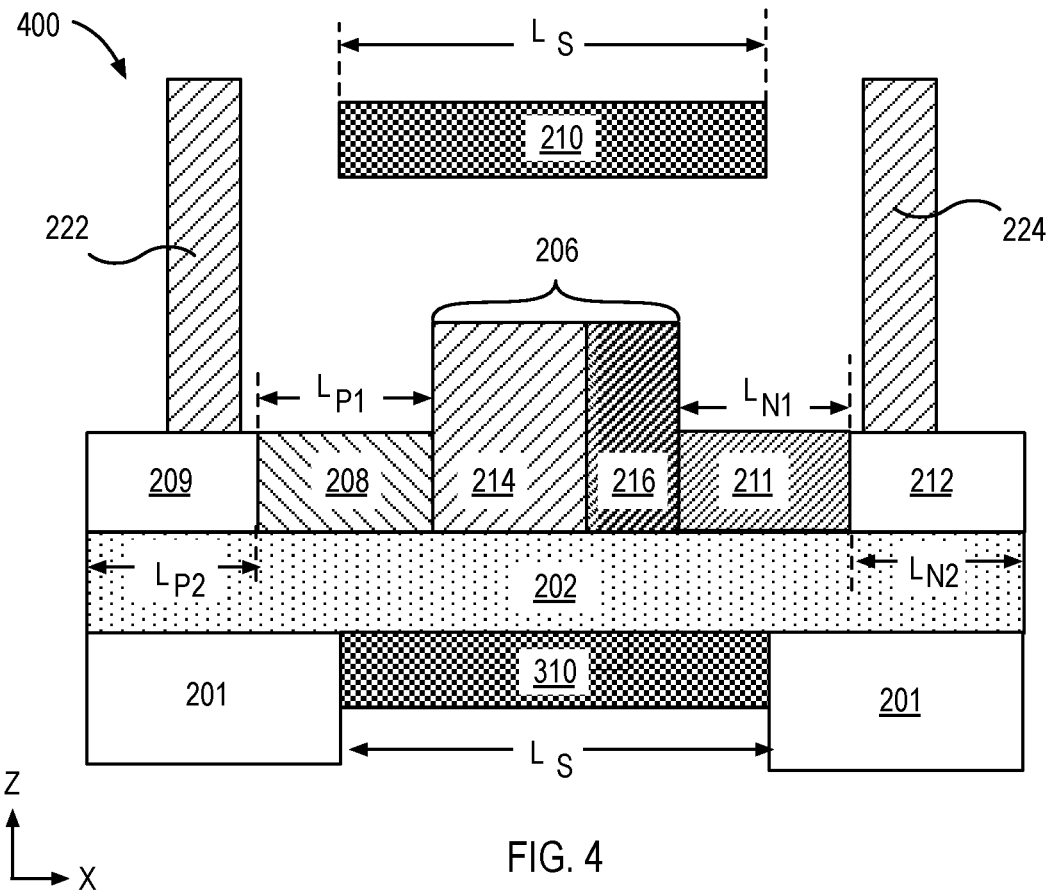
FIG. 4 is a cross-sectional illustration of an optical modulator with a stressor layer above and below the PN junction, in accordance with an embodiment.

Referring now to FIG. 4, a cross-sectional illustration of an optical modulator 400 is shown, in accordance with another embodiment. The optical modulator 400 in FIG. 4 may be substantially similar to the optical modulator 200 in FIG. 2A, with the addition of a second stress inducing film 310 below the rib region 206. Particularly, a stress inducing film 210 may be provided above the rib region 206, and the stress inducing film 310 is provided below the rib region 206. The stress inducing film 310 may be positioned on the backside surface 202A of the BOX 202 within an opening 302 through the substrate 201. In an embodiment, the stress inducing film 210 and the stress inducing film 210E include the same material. In other embodiments, the stress inducing film 210 and the stress inducing film 310 include different materials.

Figure 5:
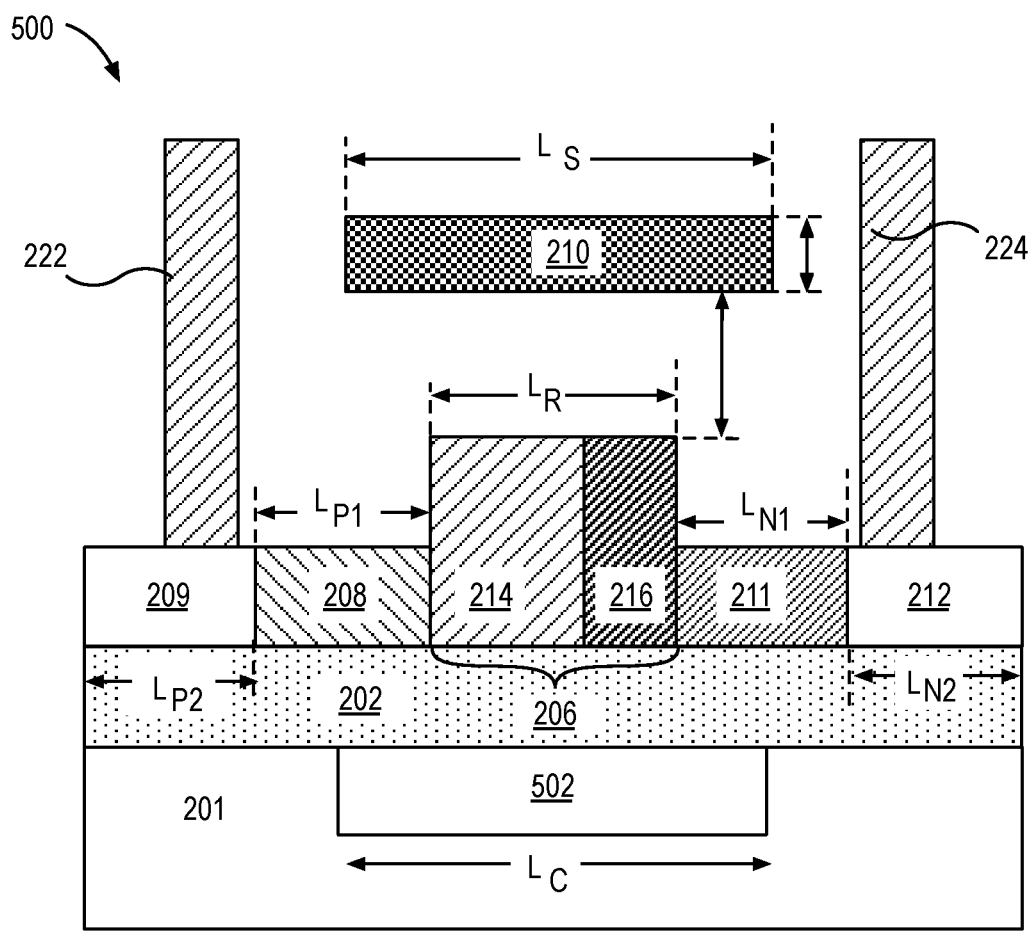
FIG. 5 is a cross-sectional illustration of an optical modulator with a stressor layer above the PN junction and a cavity below the PN junction.

Referring now to FIG. 5, a cross-sectional illustration of an optical modulator 500 is shown, in accordance with an additional embodiment. The optical modulator 200 in FIG. 5 may be substantially similar to the optical modulator 200 in FIG. 2A, with the exception that a cavity 502 is provided below the rib region 206. Referring again to FIG. 5, in an embodiment, the cavity 502 is provided in the substrate 201 below the BOX 202. In an embodiment, the cavity 502 may have a lateral thickness, $L_C$, that is equal to or greater than the lateral thickness, $L_R$, of the rib region 206. As such, the cavity 502 may extend below portions of the slab regions $204_P$ and $204_N$ in some embodiments.

In an embodiment, the presence of the cavity 502 also aids in the induction of tensile strain into the rib region 206. This is because the BOX layer 202 is bonded to the substrate 201, which is constrained and has a high compressive stress (e.g., 0.2-0.6 GPa). As such, when the underlying substrate 201 is etched to form the cavity 502, the localized removal of the substrate 201 induces a large tensile strain on the rib region 206.

Figure 6:
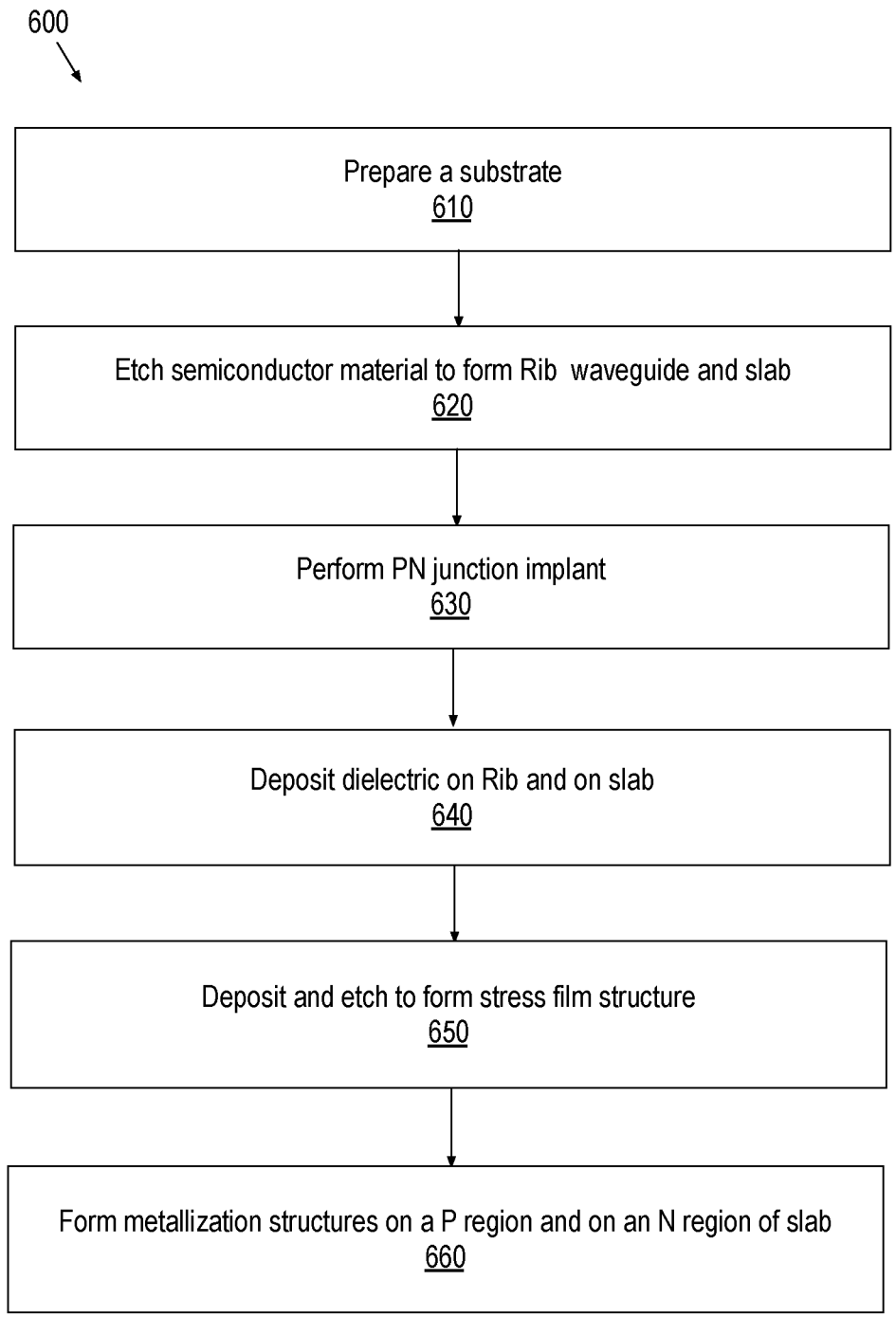
FIG. 6 is a method to fabricate an optical modulator such as an optical modulation, in accordance with an embodiment of the present disclosure.

FIG. 6 is a method 600 to fabricate a silicon modulator, in accordance with embodiments of the present disclosure. The method 600 begins at operation 610 with the preparation of a substrate. The method 600 continues at operation 620 with the patterning of a silicon layer to form a rib and a slab silicon waveguide. The method 600 continues at operation 630 with performance of a PN junction implant. The method continues at operation 640 with the process of depositing a dielectric on the rib and on the slab. The method continues at operation 650 with the deposition of a stressor film and patterning to form a stressor. The method concludes at operation 660 with the formation of metallization structures on a P region and on an N region of the slab.

Figure 7A:
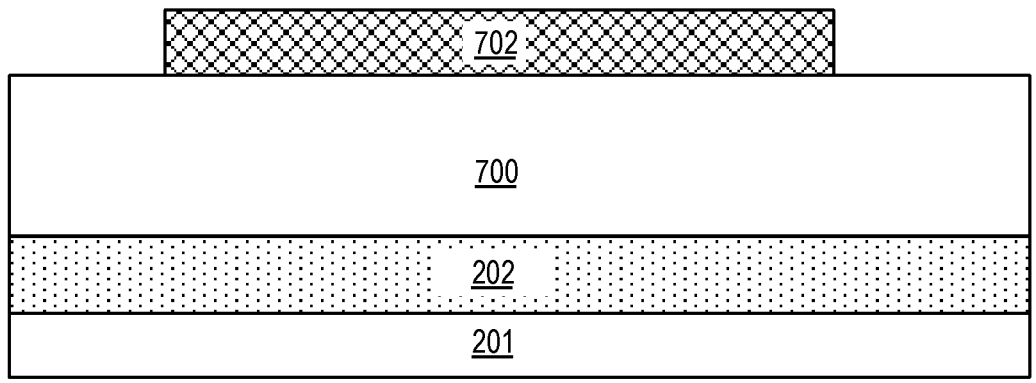
FIG. 7A is a cross-sectional illustration of a semiconductor material formed above substrate.

FIG. 7A is a cross-sectional illustration of a semiconductor material 700 formed above substrate 201. In an exemplary embodiment, the semiconductor material 700 formed above a layer 202 and is a silicon-on-insulator stack. As such, semiconductor material 700 includes a monocrystalline silicon. A mask 702 is lithographically formed on a top surface of the semiconductor material 700 to form a block. In an embodiment, the semiconductor material 700 may be patterned by a plasma etch process.

Figure 7B:
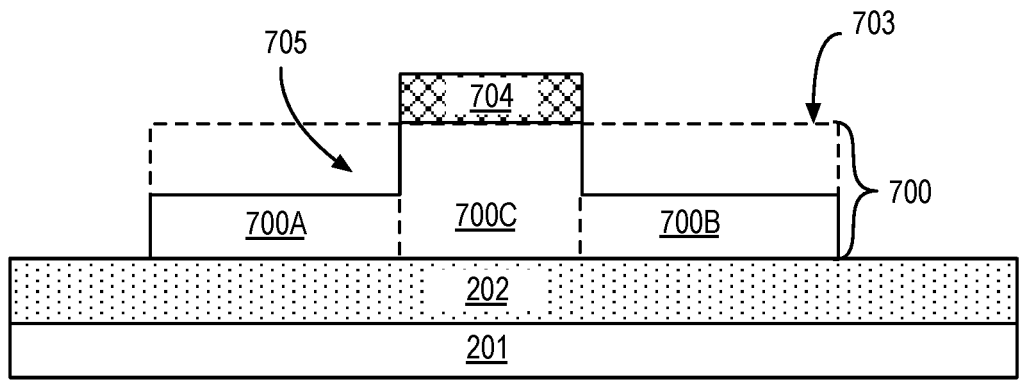
FIG. 7B is a cross-sectional illustration of the structure in FIG. 7A following the process of patterning the semiconductor material to form a rib region and slab regions.

FIG. 7B is a cross-sectional illustration of the structure in FIG. 7A following the process of patterning the semiconductor material 700 to form a block 703 (within dashed lines). After forming the block 703, a mask 704 may be formed on the block 703. In an embodiment, a plasma etch process is utilized to etch the block 703 to form the structure 705 illustrated in FIG. 7B. As shown, the etch process is halted after reaching a depth required to form slab regions 700A and 700B above the layer 202. A portion 700C of the structure 705 between 700A and 700B is a rib structure (herein rib region 700C).

Figure 7C:
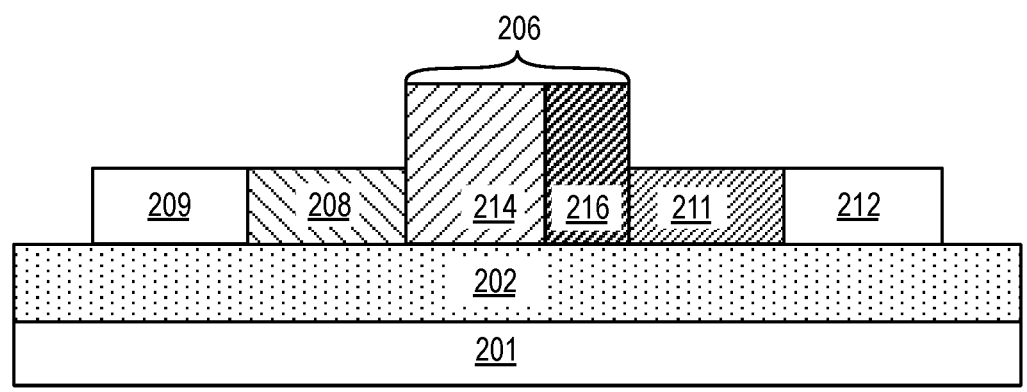
FIG. 7C is a cross-sectional illustration of the structure in FIG. 7B following the process to form a PN junction with a rib region and slab regions adjacent to the rib region.
Figure 7C:
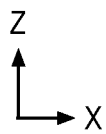

FIG. 7C is a cross-sectional illustration of the structure in FIG. 7B following the process to form a PN junction within rib region 206, and slab regions 208, 209, 214, 216, 211, and 212. In some embodiments, different regions of the structure 705 may be masked and implanted in sequence to form the slab regions 208, 209, 214, 216, 211, and 212, as well as the P-doped region 214 and N doped region 216.

Figure 7D:
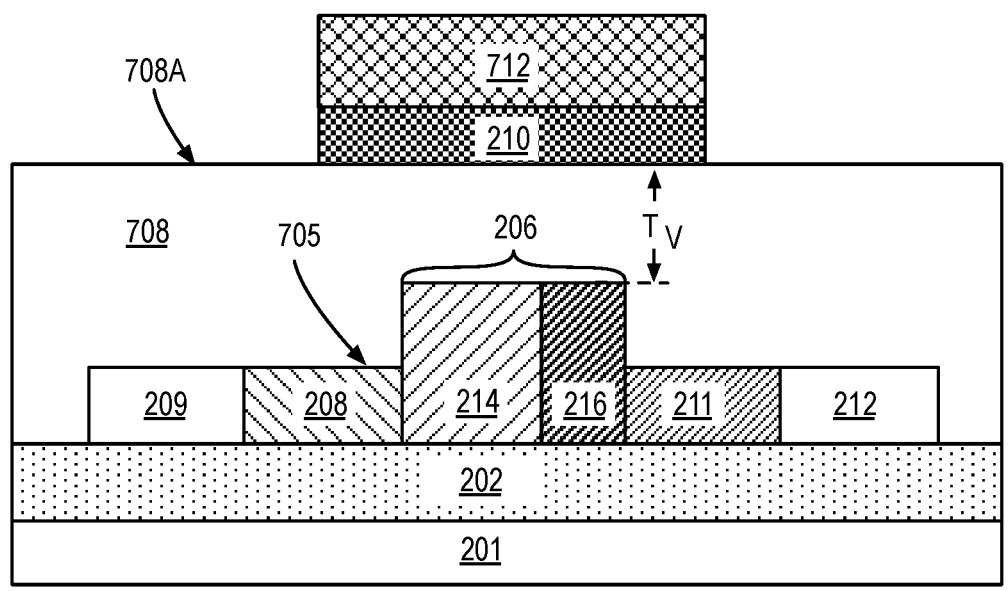
FIG. 7D is a cross-sectional illustration of the structure in FIG. 7C following the process to form a stressor structure above the rib region.

FIG. 7D is a cross-sectional illustration of the structure in FIG. 7C following the process to form a stressor structure 710 above the rib region 206. In an embodiment, a dielectric 708 is formed on the structure 705. In embodiments the dielectric 708 includes a material that is the same or substantially the same as the material of the dielectric 218. Inn embodiments, the dielectric 708 is blanket deposited. The deposition process utilized may include a PECVD (plasma enhanced chemical vapor deposition), physical vapor deposition (PVD), chemical vapor deposition (CVD) process. In an embodiment, the dielectric includes silicon and one or more of oxygen, nitrogen and/or carbon. After deposition the dielectric 708 may be planarized. In an embodiment, a chemical mechanical polish (CMP) process is utilized to planarize the dielectric 708 which forms an uppermost surface 708A that is substantially planar, as shown.

In an embodiment, a stressor material is deposited onto the uppermost surface 708A. The stressor material is designed to impart stress on the rib region 206. In embodiments, the stressor material includes a material such as but not limited to titanium, tungsten or aluminum. In embodiments, the stressor material is deposited to have tensile strain. In an embodiment, a mask 712 is formed on the stressor material. The stressor material is then patterned to form stressor layer 210. In embodiments, a plasma etch process may be utilized to etch stressor material to form stressor layer 210.

Figure 7E:
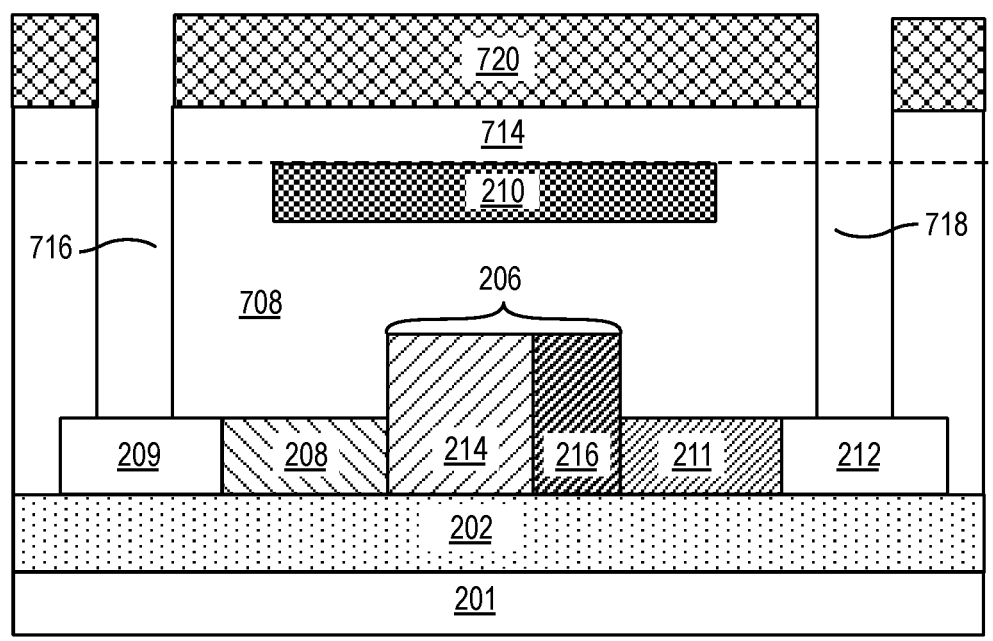
FIG. 7E is a cross-sectional illustration of the structure in FIG. 7D following the process to form openings to form metallization contacts.

FIG. 7E is a cross-sectional illustration of the structure in FIG. 7D following the process to form openings 716 and 718 to form metallization contacts. In an embodiment, a dielectric 714 is deposited on the stressor layer 210 and on the dielectric 708. A mask 720 may be formed on the dielectric 714. In an embodiment, a plasma etch is utilized to etch the dielectric 714 and dielectric 708 to form openings 716 and 718. As shown openings 716 and 718 expose portions of the slab regions 209 and 212, respectively.

Figure 7F:
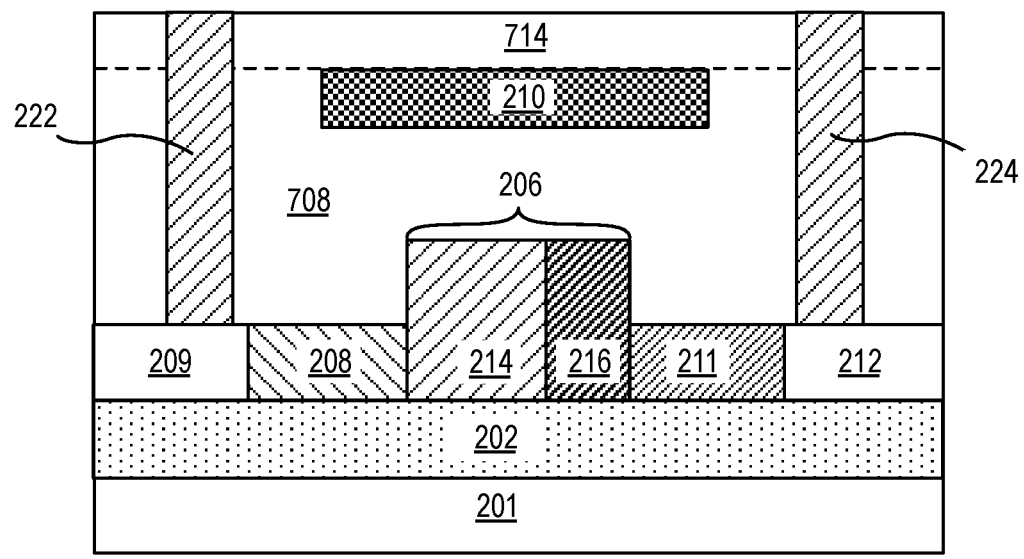
FIG. 7F is a cross-sectional illustration of the structure in FIG. 7E following the process to form metallization contacts

FIG. 7F is a cross-sectional illustration of the structure in FIG. 7E following the process to form metallization contacts. In an embodiment, one or more layers of contact metallization material are blanket deposited in the openings 716 and 718, on exposed surfaces of the slab region 209 and 212, respectively, on sidewalls of dielectric 708 and 714 and on uppermost surface of the dielectric 714. In an embodiment, the contact metallization material includes one or more materials that are substantially the same as the material of the contact metallization 222 and 224, described above in association with FIG. 2A. Referring again to FIG. 7F, in an embodiment, the contact metallization material is planarized and removed from above the uppermost surface of dielectric 714 to form contact metallization 222 and 224.

One or more process operations described in association with FIGS. 7A-7G may be utilized to fabricate optical modulator embodiments described herein. In some embodiments, a stressor layer may be formed on backside of dielectric 202, at an interface between dielectric 202 and substrate 201. In some embodiments, cavity may be formed after forming an optical modulator such as is illustrated in FIG. 7G.

Figure 8:
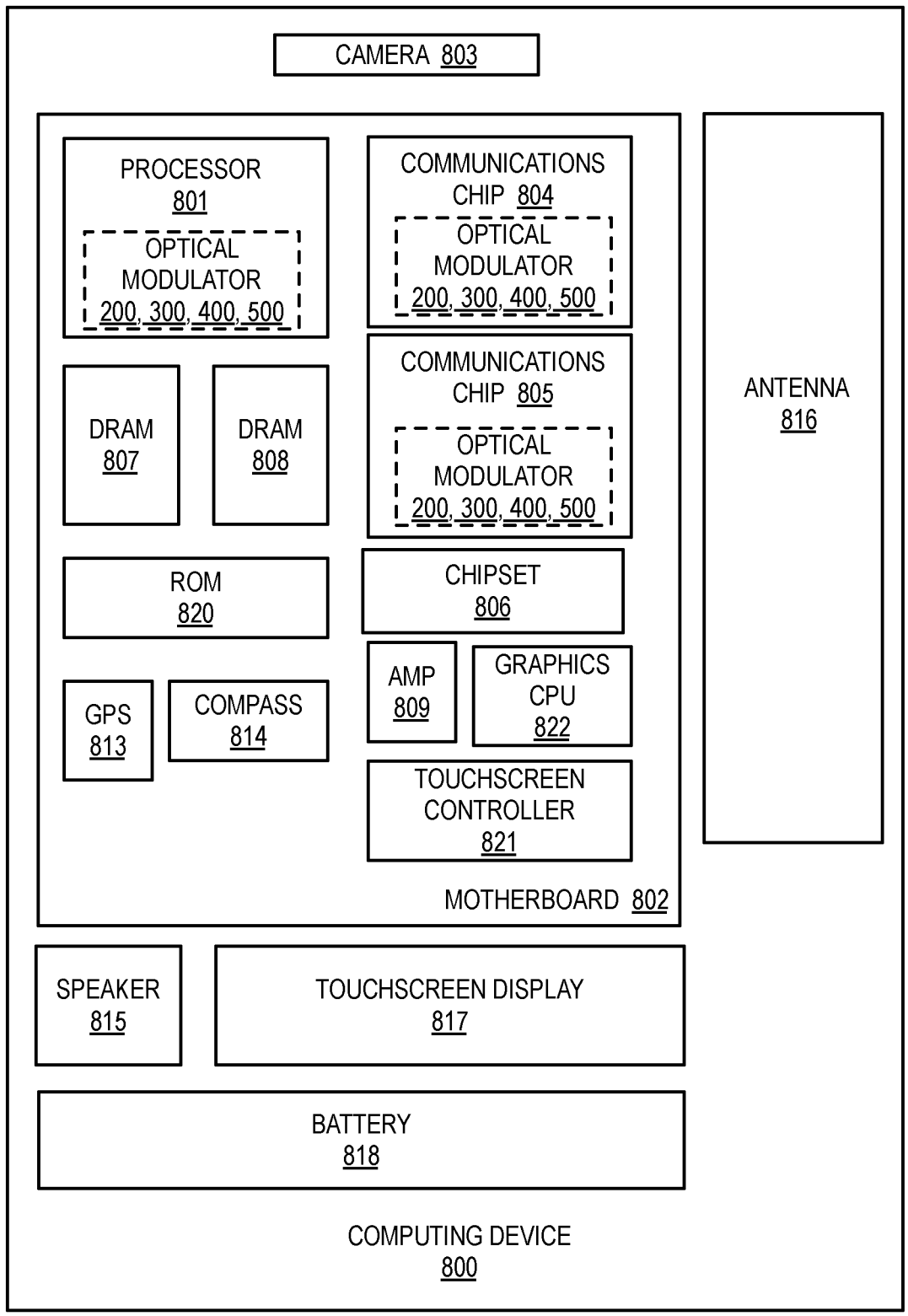
FIG. 8 is a schematic of a computing device built in accordance with an embodiment.

FIG. 8 illustrates a computing device 800 in accordance with embodiments of the present disclosure. As shown, computing device 800 houses a motherboard 802. Motherboard 802 may include a number of components, including but not limited to a processor 801 and at least one communications chip 804 or 805. Processor 801 is physically and electrically coupled to the motherboard 802. In some implementations, communications chip 805 is also physically and electrically coupled to motherboard 802. In further implementations, communications chip 805 is part of processor 801.

Communications chip 805 enables wireless communications for the transfer of data to and from computing device 800. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. Communications chip 805 may implement any of a number of wireless standards or protocols, including but not limited to Wi-Fi (IEEE 801.11 family), WiMAX (IEEE 801.11 family), long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. Computing device 800 may include a plurality of communications chips 804 and 805. For instance, a first communications chip 805 may be dedicated to shorter range wireless communications such as Wi-Fi and Bluetooth and a second communications chip 804 may be dedicated to longer range wireless communications such as GPS, EDGE, GPRS, CDMA, WiMAX, LTE, Ev-DO, and others.

Processor 801 of the computing device 800 includes an integrated circuit die packaged within processor 801. In some embodiments, the integrated circuit die of processor 801. In some implementations of the invention, the integrated circuit die of the processor 801 may be communicatively coupled to an optical modulator 200, 300, 400 or 500 with a stress inducing film above and/or below a rib region, in accordance with embodiments described herein. The term "processor" may refer to any device or portion of a device that processes electronic data from registers and/or memory to transform that electronic data into other electronic data that may be stored in registers and/or memory.

Communications chips 805 also includes an integrated circuit die packaged within communications chips 804, 805. In accordance with another implementation of the invention, the integrated circuit die of the communications chips 804, 805 may be communicatively coupled to an optical modulator 200, 300, 400 or 500 with a stress inducing film above and/or below a rib region, in accordance with embodiments described herein. In another embodiment, the integrated circuit die of communications chips 804, 805 includes one or more interconnect structures, non-volatile memory devices, capacitors and transistors. Depending on its applications, computing device 800 may include other components that may or may not be physically and electrically coupled to motherboard 802. These other components may include, but are not limited to, volatile memory (e.g., DRAM) 807, 808, non-volatile memory (e.g., ROM) 820, a graphics CPU 822, flash memory, global positioning system (GPS) device 813, compass 814, a chipset 806, an antenna 816, a power amplifier 809, a touchscreen controller 821, a touchscreen display 817, a speaker 815, a camera 803, and a battery 818, as illustrated, and other components such as a digital signal processor, a crypto processor, an audio codec, a video codec, an accelerometer, a gyroscope, and a mass storage device (such as hard disk drive, solid state drive (SSD), compact disk (CD), digital versatile disk (DVD), and so forth), or the like. In further embodiments, any component housed within computing device 800 and discussed above may contain a stand-alone integrated circuit memory die that includes one or more arrays of NVM devices.

In various implementations, the computing device 800 may be a laptop, a netbook, a notebook, an Ultrabook, a smartphone, a tablet, a personal digital assistant (PDA), an ultra-mobile PC, a mobile phone, a desktop computer, a server, a printer, a scanner, a monitor, a set-top box, an entertainment control unit, a digital camera, a portable music player, or a digital video recorder. In further implementations, the computing device 800 may be any other electronic device that processes data.

Figure 9:
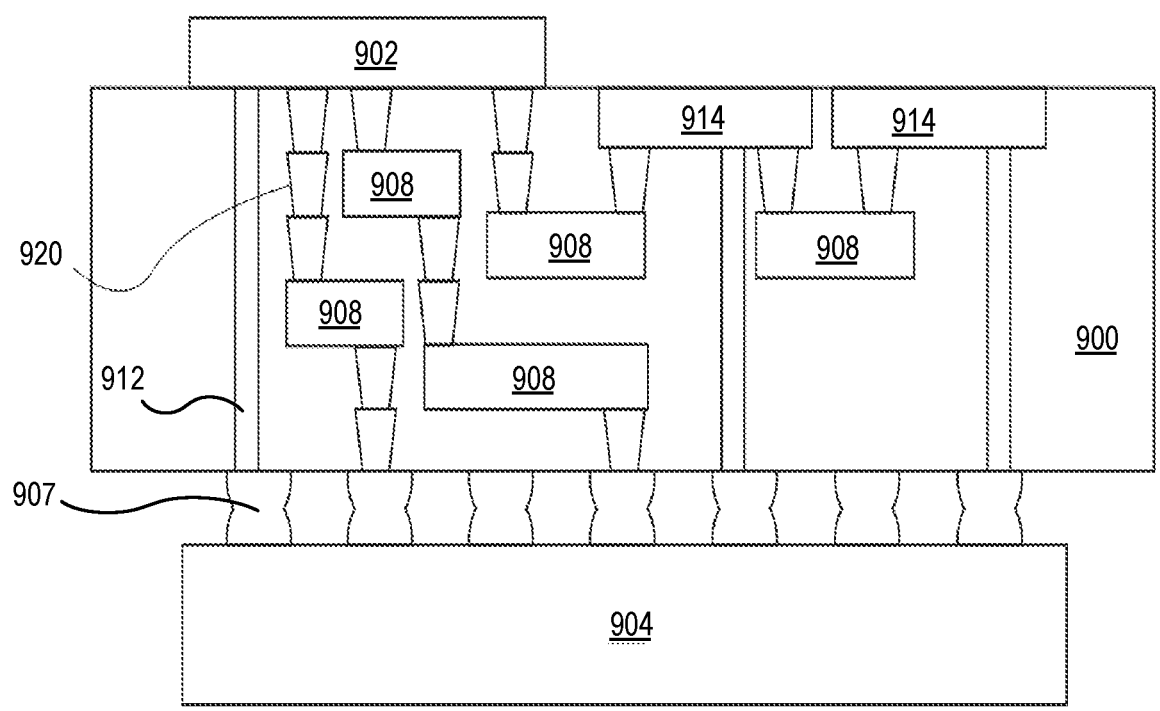
FIG. 9 illustrates an integrated circuit (IC) structure that includes one or more embodiments of the present disclosure.

FIG. 9 illustrates an integrated circuit (IC) structure 900 that includes one or more embodiments of the disclosure. The integrated circuit (IC) structure 900 is an intervening substrate used to bridge a first substrate 902 to a second substrate 904. The first substrate 902 may be, for instance, an integrated circuit die. The second substrate 904 may be, for instance, a memory module, a computer mother, or another integrated circuit die. Generally, the purpose of an integrated circuit (IC) structure 900 is to spread a connection to a wider pitch or to reroute a connection to a different connection. For example, an integrated circuit (IC) structure 900 may couple an integrated circuit die to a ball grid array (BGA) 907 that can subsequently be coupled to the second substrate 904. In some embodiments, the first substrate 902 and the second substrate 904 are attached to opposing sides of the integrated circuit (IC) structure 900. In other embodiments, the first substrate 902 and the second substrate 904 are attached to the same side of the integrated circuit (IC) structure 900. And in further embodiments, three or more substrates are interconnected by way of the integrated circuit (IC) structure 900.

The integrated circuit (IC) structure 900 may be formed of an epoxy resin, a fiberglass-reinforced epoxy resin, a ceramic material, or a polymer material such as polyimide. In further implementations, the integrated circuit (IC) structure may be formed of alternate rigid or flexible materials that may include the same materials described above for use in a semiconductor substrate, such as silicon, germanium, and other group III-V and group IV materials.

The integrated circuit (IC) structure may include metal interconnects 908 and vias 910, including but not limited to through-silicon vias (TSVs) 912. The integrated circuit (IC) structure 900 may further include embedded devices 914, including both passive and active devices. Such embedded devices 914 include capacitors, decoupling capacitors, resistors, inductors, fuses, diodes, transformers, device structure including transistors, optical modulators 200, 300, 400 or 500 described in association with FIG. 2A, 3, 4 or 5, respectively. Referring again to FIG. 9, the integrated circuit (IC) structure 900 may further include embedded devices 914 such as one or more resistive random-access devices, sensors, and electrostatic discharge (ESD) devices. More complex devices such as radiofrequency (RF) devices, power amplifiers, power management devices, antennas, arrays, sensors, and MEMS devices may also be formed on the integrated circuit (IC) structure 900.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

In a first example, an optical modulator includes a substrate, a first dielectric layer over the substrate, a rib waveguide including a PN junction on the first dielectric, a second dielectric layer over the rib waveguide and a stressor layer including a metal, where the first or the second dielectric is between the stressor layer and the PN junction.

In second examples, for any of first examples, the rib structure includes a P-doped region adjacent an N-doped region, and where the optical modulator further includes a first slab region adjacent to the P-doped region and a second slab region adjacent to the N-doped region.

In third examples, for any of the first through second examples, the rib waveguide includes monocrystalline silicon and the first slab region and the second slab region each include monocrystalline silicon.

In fourth examples, for any of the first through third examples, the rib waveguide has a first vertical thickness as measured from an uppermost surface of the first dielectric that is greater than a vertical thickness of the first slab region or the second slab region.

In fifth examples, for any of the first through fourth examples, the first slab region includes a P+ region adjacent to the P doped region, and a P++ region adjacent to the P+ region, where the second slab region includes an N+ region adjacent to the N doped region and a N++ region adjacent to the N+ region.

In sixth examples, for any of the first through fifth examples, the stressor layer includes tungsten, titanium or aluminum.

In seventh examples, for any of the first through sixth examples, the second dielectric is between the stressor layer and the PN junction, and where the stressor layer is spaced above the PN junction by a distance of at least 0.5 micron.

In eighth examples, for any of the first through seventh examples, the second dielectric is between the stressor layer and the PN junction, and where the stressor layer extends laterally above the first slab region and the second slab region.

In ninth examples, for any of the first through eighth examples, the first dielectric is between the stressor layer and the PN junction, and where the stressor layer is below the PN junction by a distance substantially equal to a thickness of the first dielectric.

In tenth examples, for any of the second example, the stressor layer is a first stressor layer and the optical modulator further includes a second stressor layer, where the first dielectric is between the first stressor layer and the PN junction, and where the second dielectric is between the second stressor layer and the PN junction.

In eleventh examples, for any of the second and the tenth examples, the second stressor layer extends laterally under the pair of slab regions.

In twelfth examples, for any of the first through eleventh examples, the substrate includes a cavity directly below the rib structure.

In thirteenth examples, for any of second example, the substrate includes a cavity directly below the rib structure.

In a fourteenth example, for any of the thirteenth examples, the cavity further extends laterally below the pair of slab regions.

In fifteenth examples, for any of the first through thirteenth examples, the optical modulator further includes a first contact metallization adjacent to the first slab region, and a second contact metallization adjacent to the second slab region.

In sixteenth examples, for any of the fifteenth examples, the method includes etching a semiconductor material to form a rib waveguide and a slab on a dielectric above a substrate, and performing a PN junction implant. The method further includes depositing a conductive material on the dielectric and etching the conductive material to form a stressor structure and forming metallization structures on a P region and on an N region of slab.

In seventeenth examples, for any of the fifteenth through sixteenth examples, forming the stress film structure includes depositing a tensile strained material such as tungsten, aluminum or titanium.

In eighteenth examples, for any of the fifteenth through seventeenth examples, the method further includes forming a cavity in the substrate under the rib waveguide.

In nineteenth examples, optical modulator includes a substrate, a first dielectric layer over the substrate, a rib waveguide including a PN junction on the first dielectric, a second dielectric layer over the rib waveguide and a stressor layer including a metal, where the first or the second dielectric is between the stressor layer and the PN junction. The system further includes a battery to power the system.

In twentieth example, for any of the nineteenth example, the system further includes a display communicatively coupled to at least one processor or an antenna.

What is claimed is:

1. An optical modulator apparatus, comprising:
   a first dielectric layer over a substrate;
   a rib waveguide comprising a PN junction on the first dielectric layer, the PN junction of the rib waveguide comprising a P-doped region adjacent an N-doped region;
   a first slab region adjacent to the P-doped region and a second slab region adjacent to the N-doped region;
   a second dielectric layer over the rib waveguide; and
   a stressor layer comprising a metal, wherein the second dielectric layer is between the stressor layer and the PN junction, and wherein the stressor layer extends laterally above the first slab region and the second slab region.

2. The optical modulator apparatus of claim 1, wherein the rib waveguide, the first slab region, and the second slab region each comprise monocrystalline silicon.

3. The optical modulator apparatus of claim 1, wherein the rib waveguide has a first vertical thickness as measured from an uppermost surface of the first dielectric layer that is greater than a vertical thickness of the first slab region and the second slab region.

4. The optical modulator apparatus of claim 1, wherein the first slab region comprises a P+ region adjacent to the P-doped region, and a P++ region adjacent to the P+ region, and wherein the second slab region comprises an N+ region adjacent to the N-doped region, and a N++ region adjacent to the N+ region.

5. The optical modulator apparatus of claim 1, wherein the stressor layer comprises tungsten, titanium or aluminum.

6. The optical modulator apparatus of claim 1, wherein the stressor layer is spaced above the PN junction by a distance of at least 0.5 micron.

7. The optical modulator apparatus of claim 1, wherein the substrate comprises a cavity directly below the rib waveguide.

8. The optical modulator apparatus of claim 7, wherein the cavity further extends laterally below the first slab region and the second slab region.

9. The optical modulator apparatus of claim 1, further comprising a first contact metallization adjacent to the first slab region, and a second contact metallization adjacent to the second slab region.

10. The optical modulator apparatus of claim 1, further comprising:
    a processor or a communications chip comprising the substrate, the first dielectric layer, the rib waveguide, the first slab region, the second slab region, the second dielectric layer, and the stressor layer; and
    a battery, a display, or an antenna coupled to the processor or the communications chip.

11. An optical modulator apparatus, comprising:
    a first dielectric layer over a substrate;
    a rib waveguide comprising a PN junction on the first dielectric layer, the PN junction of the rib waveguide comprising a P-doped region adjacent an N-doped region;
    a first slab region adjacent to the P-doped region and a second slab region adjacent to the N-doped region;
    a second dielectric layer over the rib waveguide; and
    a stressor layer comprising a metal, wherein the first dielectric layer is between the stressor layer and the PN junction, and wherein the stressor layer is below the PN junction by a distance substantially equal to a thickness of the first dielectric layer.

12. The optical modulator apparatus of claim 11, wherein the rib waveguide, the first slab region, and the second slab region each comprise monocrystalline silicon.

13. The optical modulator apparatus of claim 11, wherein the stressor layer comprises tungsten, titanium, or aluminum.

14. The optical modulator apparatus of claim 11, wherein the stressor layer extends laterally below the first slab region and the second slab region.

15. The optical modulator apparatus of claim 11, further comprising:
- a processor or a communications chip comprising the substrate, the first dielectric layer, the rib waveguide, the first slab region, the second slab region, the second dielectric layer, and the stressor layer; and
- a battery, a display, or an antenna coupled to the processor or the communications chip.

16. An optical modulator apparatus, comprising:
- a first dielectric layer over a substrate;
- a rib waveguide comprising a PN junction on the first dielectric layer, the PN junction of the rib waveguide comprising a P-doped region adjacent an N-doped region;
- a first slab region adjacent to the P-doped region and a second slab region adjacent to the N-doped region;
- a second dielectric layer over the rib waveguide;
- a first stressor layer comprising a metal; and
- a second stressor layer, wherein the first dielectric layer is between the first stressor layer and the PN junction, and wherein the second dielectric layer is between the second stressor layer and the PN junction.

17. The optical modulator apparatus of claim 16, wherein the rib waveguide, the first slab region, and the second slab region each comprise monocrystalline silicon.

18. The optical modulator apparatus of claim 16, wherein the first stressor layer comprises tungsten, titanium, or aluminum.

19. The optical modulator apparatus of claim 16, wherein the second stressor layer extends laterally under the first slab region and the second slab region.

20. The optical modulator apparatus of claim 16, further comprising:
- a processor or a communications chip comprising the substrate, the first dielectric layer, the rib waveguide, the first slab region, the second slab region, the second dielectric layer, the first stressor layer, and the second stressor layer; and
- a battery, a display, or an antenna coupled to the processor or the communications chip.

\* \* \* \* \*